United States Patent
King

(10) Patent No.: US 6,846,393 B2
(45) Date of Patent: Jan. 25, 2005

(54) ELECTROLYSIS CELLS

(75) Inventor: Cameron James King, Murrumba Downs (AU)

(73) Assignee: Waterpower Systems PTY LTD, Queensland (AU)

( * ) Notice: Subject to any disclaimer, the term of this patent is extended or adjusted under 35 U.S.C. 154(b) by 102 days.

(21) Appl. No.: 10/181,666

(22) PCT Filed: Jan. 19, 2002

(86) PCT No.: PCT/AU01/00054
§ 371 (c)(1),
(2), (4) Date: Oct. 9, 2002

(87) PCT Pub. No.: WO01/53568
PCT Pub. Date: Jul. 26, 2001

(65) Prior Publication Data
US 2003/0089599 A1 May 15, 2003

(30) Foreign Application Priority Data
Jan. 21, 2000 (AU) .............................. PQ 5206

(51) Int. Cl.⁷ .............................................. C25D 17/00
(52) U.S. Cl. .................................... 204/269; 205/278.5
(58) Field of Search ............................... 204/269–270, 204/253–258, 278.5

(56) References Cited
U.S. PATENT DOCUMENTS 3,875,041 A    4/1975   Harvey et al.
3,966,567 A    6/1976   Pace et al.
4,102,754 A  * 7/1978   Hedges et al. .............. 204/269
4,129,494 A   12/1978   Norman
4,789,450 A   12/1988   Paterson
4,790,923 A   12/1988   Stillman
5,611,907 A    3/1997   Herbst et al.
6,139,710 A   10/2000   Powell

FOREIGN PATENT DOCUMENTS

| AU | 80 591/82 | 2/1982 |
| GB | 1045816 | 10/1966 |
| JP | 9291389 | 11/1997 |
| RU | 1284274 | 10/1996 |

* cited by examiner

Primary Examiner—Donald R. Valentine
(74) Attorney, Agent, or Firm—Greer, Burns & Crain, Ltd.

(57) ABSTRACT

An electrolysis cell comprises a housing receiving a plurality of parallel electrodes separated by guides to define a plurality of passageways through which an electrolyte solution is flowed from an inlet end to an outlet end, the solution being subjected to electrolysis by applying an electrical potential between electrodes. At the inlet and outlet ends, spaced wall means engage with the electrodes to extend the electrolyte passageways and confine electrolyte to the respective passageways whereby a short circuit through the electrolyte between electrodes is avoided.

27 Claims, 5 Drawing Sheets

ELECTROLYSIS CELLS

BACKGROUND OF THE INVENTION

This invention relates to improvements in electrolysis cells and relates particularly to an improved cell having multiple electrodes between which an electrolyte is circulated.

The invention will be described with particular reference to an electro-coagulation cell design incorporating a plurality of electrodes. However, it will be appreciated that the principles of the invention may be applied to any electrolysis cell incorporating a plurality of substantially parallel electrodes.

DESCRIPTION OF THE PRIOR ART

Many forms of electrolysis cell are known for different purposes. Such cells are commonly used for electro-winning metal values by electrodeposition. U.S. Pat. Nos. 4,129,494 and 3,875,041 disclose forms of such cells in which an electrolyte is forced to flow in alternate paths between electrodes.

Japanese Specification 98-037311/04 discloses a cell having guides along side walls for retaining and separating alternate anode and cathode plates.

In the design of a cell for an electro-coagulation system, a plurality of substantially parallel electrodes are mounted in a flow path of the solution to be subject to electrolysis. In one particular form, a cell housing of rectilinear configuration is provided with a plurality of opposed slots extending along opposed side walls, the slots being adapted to receive a plurality of substantially parallel plate electrodes extending the length of the housing. An inlet manifold is provided at one end of the housing and an outlet manifold is located at the opposite end of the housing. An electric potential is applied between the two outermost plate electrodes or between adjacent groups of plate electrodes, whereby, when the electrolyte to be treated flows through the housing, an electric current passes between the electrodes to electrolyse the solution. The electrical connections to the cell can be configured in either series (an electrical potential is applied to the first and last electrode plate contained within the electrode housing) or in parallel (an electrical potential is applied to more than two electrodes with at least one bipolar electrode inserted between unipolar electrodes—the electrodes where electric potential is applied).

The series configuration forms one group of electrodes (two unipolar electrodes and a number of bipolar electrodes inserted between them) whereas the parallel configuration forms more than one group of electrodes (three or more unipolar electrodes and at least one bipolar electrode inserted between the unipolar electrodes).

The purpose of the multi-electrode cell design is to force current to flow through the solution between the respective electrodes in the cell. However, with current cell designs, current leakage occurs as current is able to flow directly between two successive unipolar electrodes to which the electrical potential is directly applied through bridging solution external to the reaction surfaces of those unipolar electrodes and intermediate bipolar electrodes thus forming an effective short circuit at the inlet and outlet ends of the cell. Thus, at the entry and exit ends of the unipolar electrodes which are at different electrical potential, the electrolyte surrounding the electrode ends forms a conductive bridge which enables current to bypass the bipolar electrodes and form a short-circuit from the electrode at low potential to the electrode at the higher potential. The short-circuiting between the unipolar electrodes removes electrons from the intended path through the electrolyte passing between the surfaces of the groups of electrodes where electrochemical reactions (electro-coagulation) are to occur. The short-circuit, therefore, substantially reduces efficiency of the electrolysis cell.

U.S. Pat. No. 4,129,494 recognises the problem of reduced electrodeposition due to current leakage in bipolar electrode cells. However, that specification suggests that the problem can be prevented or reduced by the use of electrodes sitting in recessed slots such that there is a close fit between the electrodes sides and the sides of the cell whereby the electrodes are held in place by the hydraulic pressure of the flowing electrolyte. It is also suggested that the use of non-conductive baffle plates or coatings may be used over a portion of the electrode surface. However, the use of slots is not appropriate in a cell where the electrolyte flow is in parallel with the bank of electrodes. The use of baffle plates or insulating coatings reduces the effective surface of the electrodes thereby reducing the effectiveness of the cell.

SUMMARY OF THE INVENTION

It is therefore desirable to provide an improved cell design which obviates the disadvantages of the known cell designs.

It is also desirable to provide an improved electro-coagulation cell whereby a short circuit or "current leakage" between electrodes is substantially prevented.

It is also desirable to provide an improved electrolysis cell which is economic to manufacture and is simple to use.

It is also desirable to provide an improved electrolysis cell for electro-coagulation of a solution subject to electrolysis.

It is also desirable to provide an electro-coagulation cell which operates at a relatively high efficiency.

In accordance with one aspect of the invention there is provided an electrolysis cell comprising a housing defining a passage for electrolyte to be subjected to electrolysis, the housing having an inlet end and an outlet end, a plurality of opposed guides extending longitudinally of the passage, a plurality of substantially parallel plate electrodes supported in spaced relation by the guides, the electrodes dividing the passage into a plurality of longitudinal electrolyte passageways, spaced walls means at both the inlet and outlet ends of the passage, the respective inlet and outlet wall means each corresponding in number to the number of electrodes, the wall means defining inlet passageways and outlet passageways communicating with the respective electrolyte passageways defined by the electrodes, the wall means confining electrolyte to the respective passageways.

Preferably, end surfaces of the wall means engage corresponding edges of the electrodes to form respective separate, individual passageways for the flow of electrolyte incorporating the series of inlet passageways, electrode passageways and outlet passageways.

In one preferred form of the invention, the guides comprise a plurality of grooves formed in opposite walls of the housing, the grooves defining a plurality of ribs or spacers, and the electrodes are engaged within the grooves.

In an alternative form, the guides may be a separate structure to the housing and the electrodes may either be assembled in the housing together with the guides or the guide and electrode assembly may constitute a separate structure which is able to be removed or inserted as a unit into the housing.

Preferably, the outlet end is contained within a cell head mounted to the main housing and the outlet end passageways extend at right angles to the longitudinal direction of the electrolyte passageways. With this arrangement, the wall means are integral with the cell head and are adapted to engage side edges of the electrodes extending into the cell head. This enables the electrolysis cell to discharge treated electrolyte laterally from the housing to a tank or the like.

By providing a plurality of spaced walls which engage with the edges of the electrodes, short circuiting between the electrodes is substantially prevented as the length of the conductive path through the electrolyte is such that the path of least resistance becomes the path through the electrolyte solution between surfaces of electrode pairs. The reduction of short circuiting between electrodes improves the efficiency of the cell and the typically achievable conversion of electrical energy to chemical energy for electrolysis purposes.

In order that the invention is more readily understood, an embodiment thereof will now be described with reference to the accompanying drawings wherein.

Figure 1:
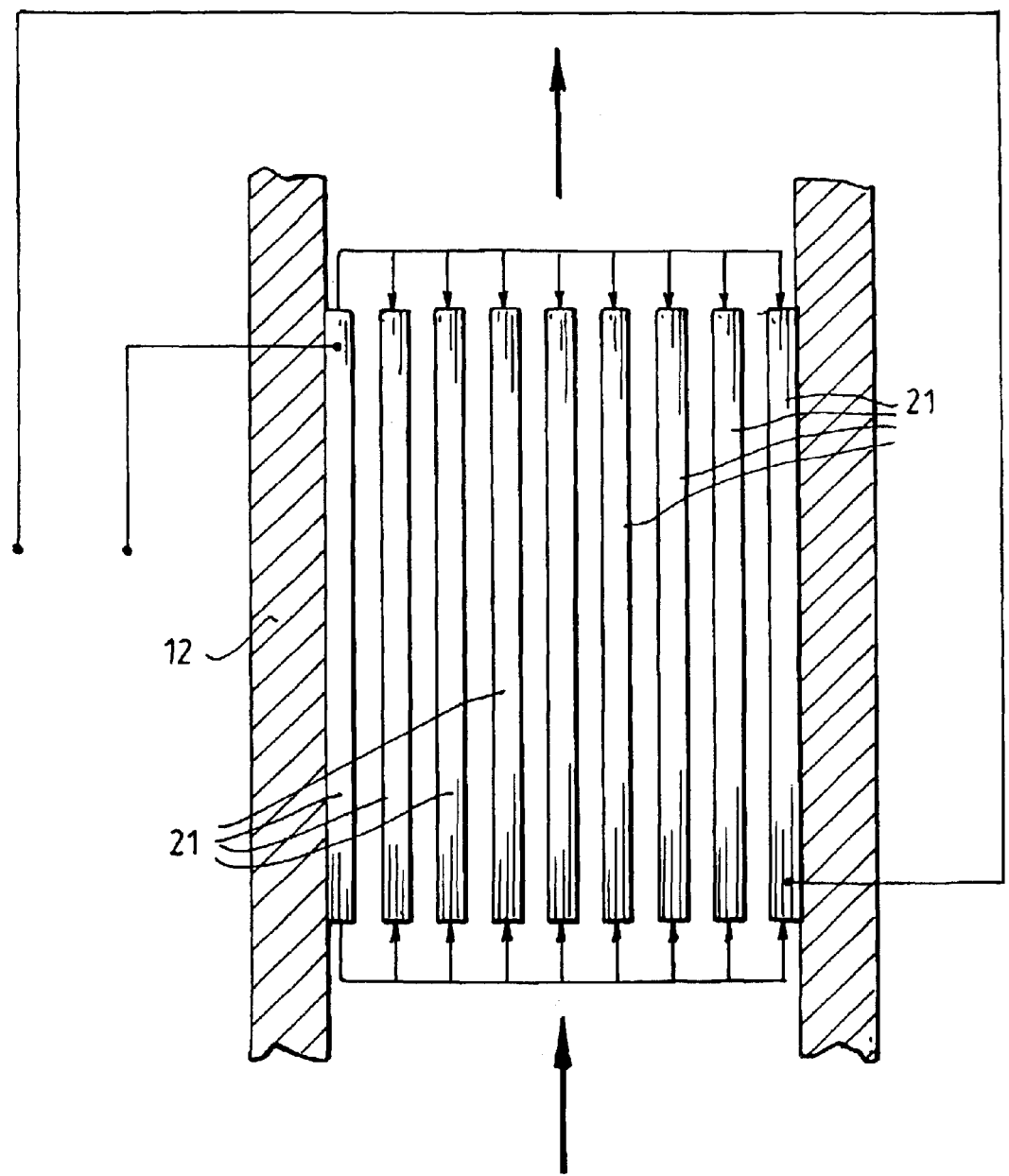
FIG. 1 is a diagrammatic illustration of an electrolysis cell of the prior art.

Referring to the drawings, FIG. 1 schematically illustrates a typical prior art design of an electro-coagulation system used in fluid treatment plants for treatment of, and purification of, a conductive solution such as might be produced by a manufacturing, treatment, refining or other process.

With the electro-coagulation system, a conductive solution is caused to flow between a plurality of electrodes at different electrical potential, and current is caused to flow between the electrodes through the solution which results in a chemical reaction within the solution and, in many cases, between the solution and the electrode material.

As shown in FIG. 1, however, in the prior art design, at the entry and exit ends of the treatment area defined by the electrodes, current is able to pass directly between the end electrodes, to which the electrical potential is applied, thereby providing a current path which short-circuits the path through the individual electrodes. This current leakage reduces the amount of current actually passing between the electrodes as the solution surrounding the electrode ends forms a conductive bridge for current to pass from the electrode at highest potential to the electrode at lowest potential. The short-circuiting current path will not pass through all of the electrolyte solution, the conductive bridge being established along the line of least resistance at any particular time.

This short circuiting of electric current reduces the efficiency of the system by removing electrons from the intended path of movement, which is through the solution contained between the electrode surfaces where the electro-chemical reaction (electro-coagulation) occurs. The result of such a typical cell design is a relatively low efficiency, i.e. lower than the theoretically achievable conversion of electrical energy into chemical energy.

Figure 2:
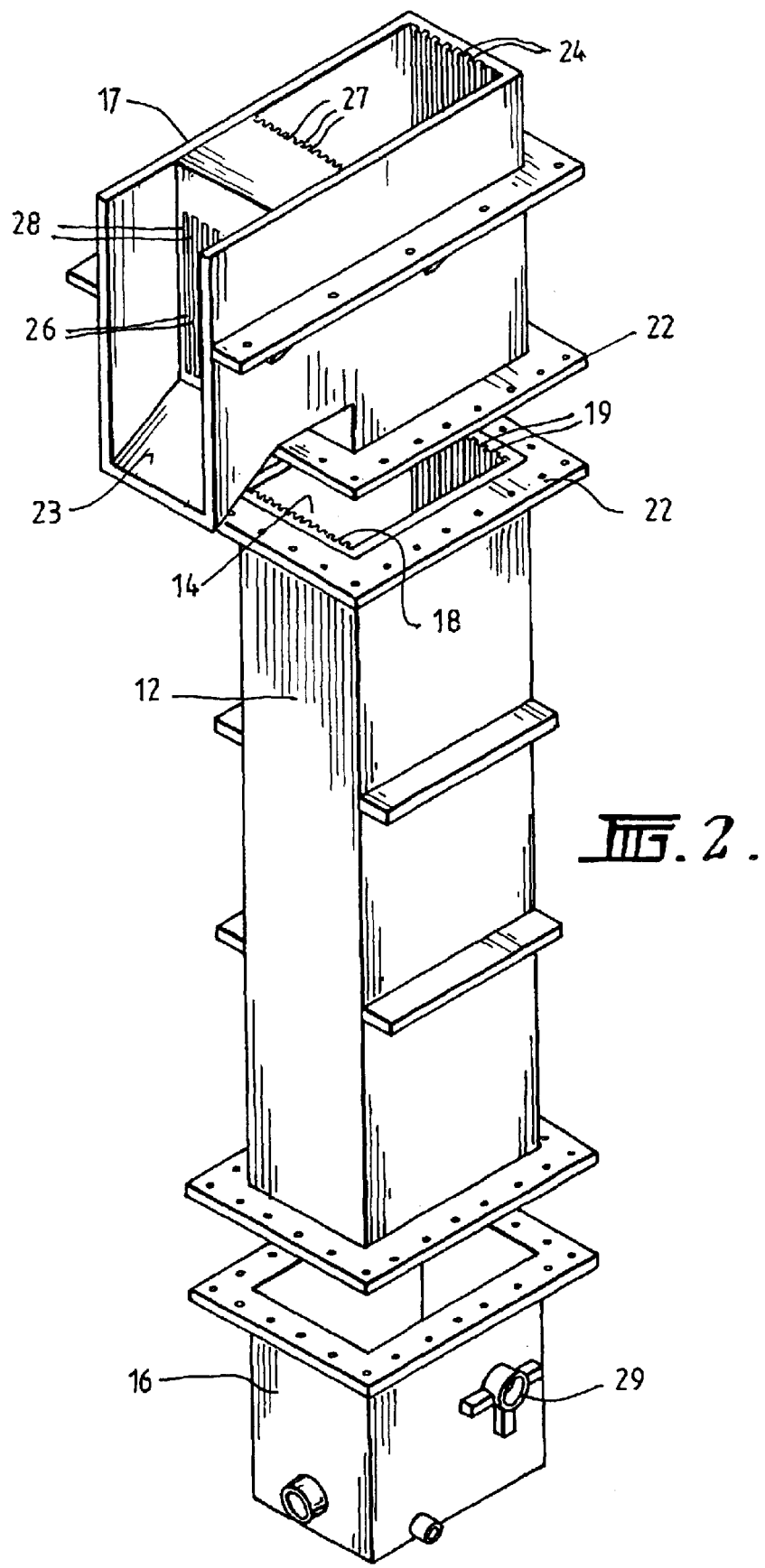
FIG. 2 is an exploded view of one form of cell in accordance with an embodiment of the present invention.
Figure 3:
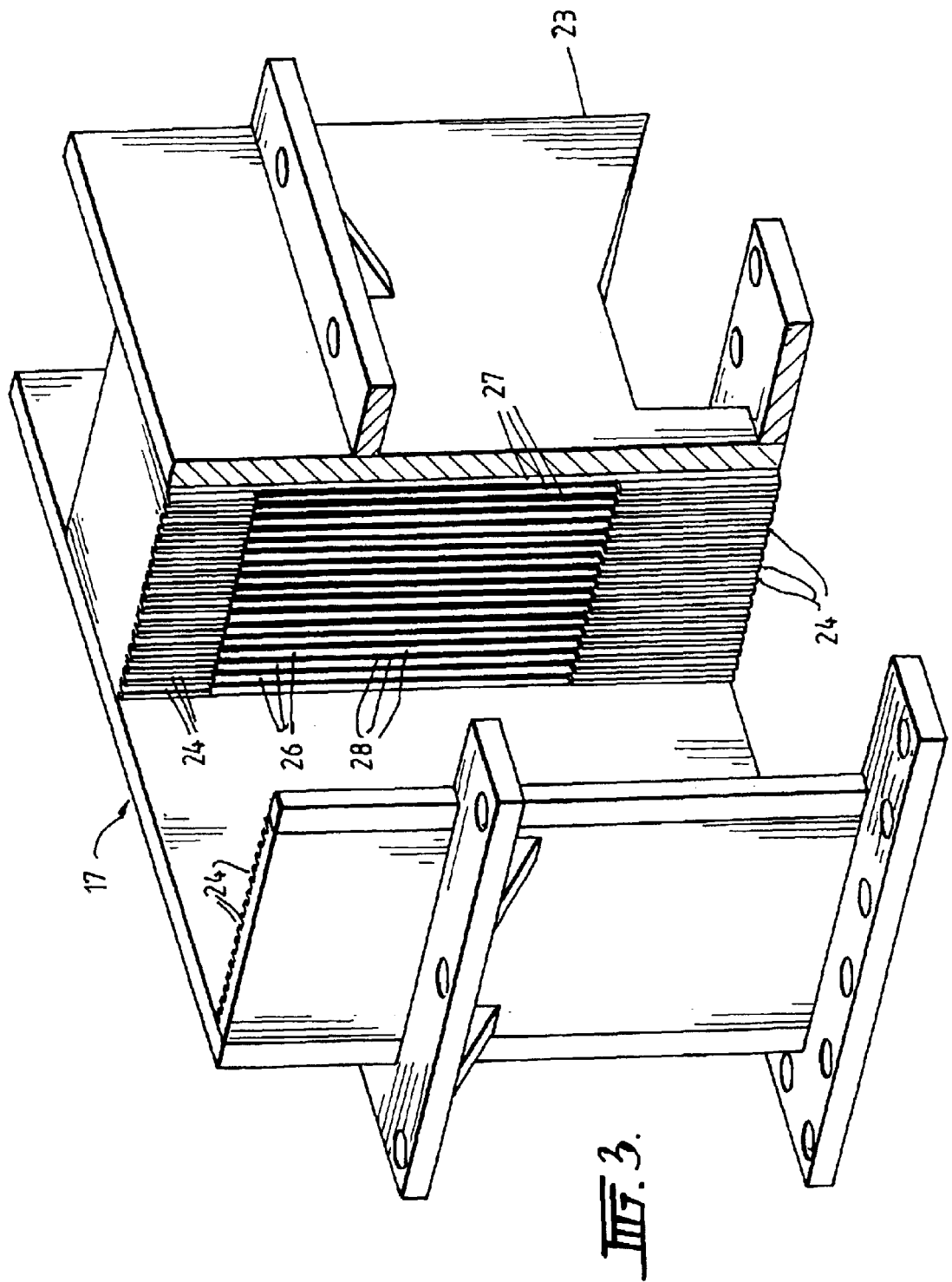
FIG. 3 is a sectional isometric view of the cell head shown in FIG. 2.

Referring to FIGS. 2 and 3, a cell in accordance with this embodiment of the present invention comprises a housing 12 which is of substantially rectangular cross-sectional and which defines a passage 14 for the flow of an electrolyte solution. The housing 12 has an entry feed box 16 and a cell head 17 defining inlet and outlet passages for the flow of the electrolyte solution.

The housing 12 is provided with a plurality of longitudinally extending spacers 18 on opposed side walls, the spacers 18 defining a plurality of channels 19 to receive side edges of a plurality of spaced, plate electrodes 21. The electrodes 21 divide the passage 14 into a plurality of discrete passageways for the electrolyte solution.

Figure 4:
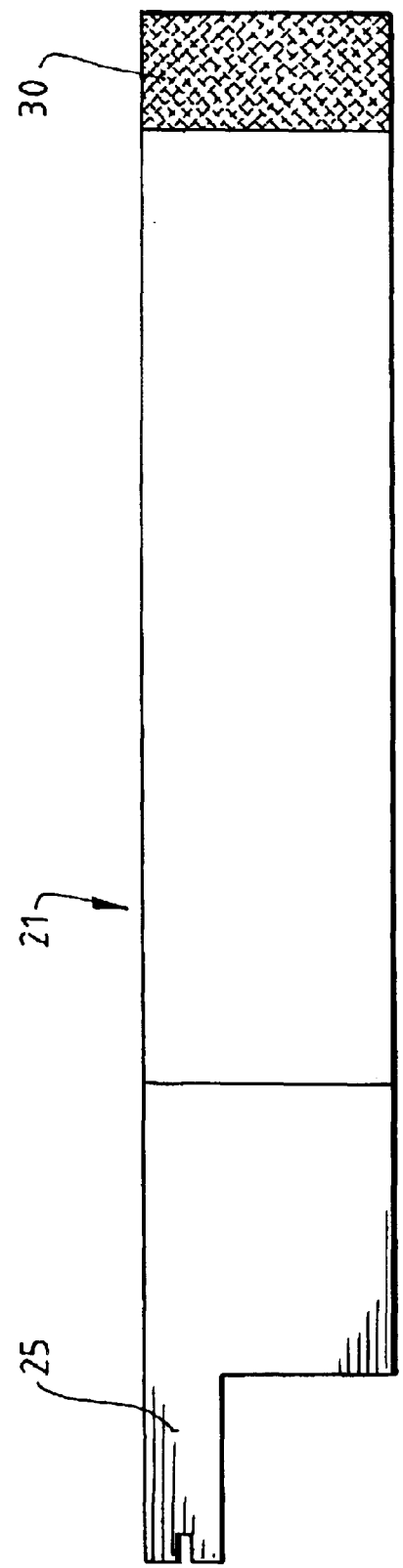
FIG. 4 is an elevational view of an electrode and an associated non-conductive wall.

Each electrode 21, as shown in FIG. 4, is generally rectangular in outline with one end having a tag 25 by means of which the electrode can be introduced into and removed from the housing 12. The tag 25 also permits electrodes to be connected to a source of electrical power as appropriate for the electro-coagulation to be effected within the housing 12.

At the other, or lower, end of the electrode 21, the lower edge thereof is engaged with a wall insert 30 effectively forming an extension of the electrode 21. The wall insert is adapted to be positioned adjacent the entry feed box 16, the upper edge of which forms an abutment for the lower ends of the channels 19 formed in the walls of the housing 12.

The cell head 17, which is adapted to be mounted to the upper end of the housing 12 by means of interengaging flanges 22 with appropriate gaskets and connecting bolts (not shown), is designed to convey the electrolyte solution from the passage 14 after reaction with the electrodes. The cell head 17 has an outlet 23 from which treated solution may flow into a tank or other container.

The cell head 17 is formed with spacers 24 similar to the spacers 18 of the housing 12 and aligned therewith. The cell head 17 is also formed with a plurality of spaced walls 26 the inner edges 27 of which abut corresponding side edges of the electrodes 21 assembled in the housing 12. The walls 26 define therebetween outlet passageways 28 through which solution from the passage 14 flows to the outlet 23.

Figure 5:
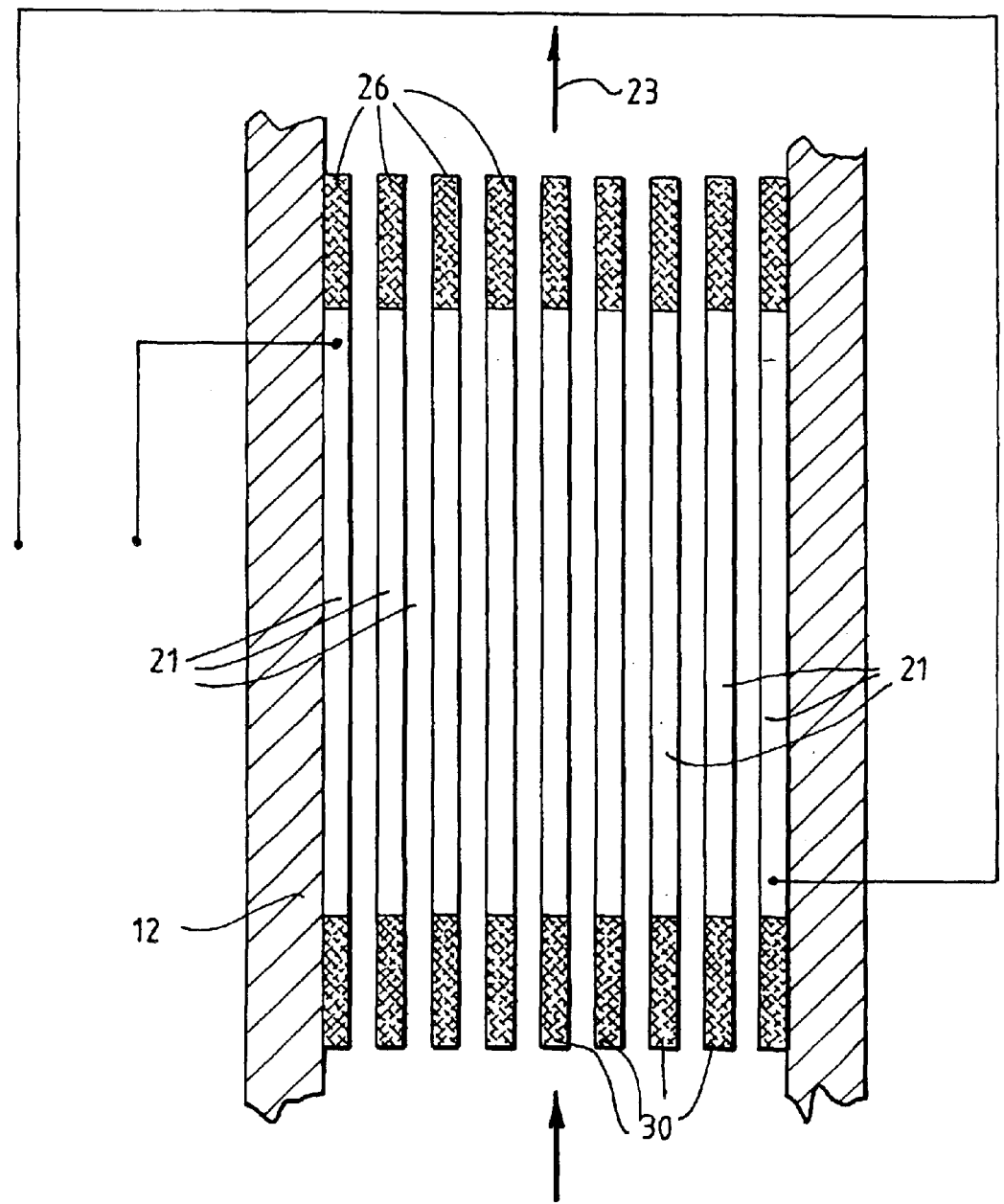
FIG. 5 is a diagrammatic illustration of an electrolysis cell incorporating the features of this invention.

As will be seen and as particularly illustrated in FIG. 5, the provision of the walls 26 and 30 abutting the respective edges of the electrodes 21 prevents short circuiting between the electrodes of different potential. The walls 26 confine the flow of electrolyte solution from the passageways defined between the electrodes 21 to the outlet passages 28 so that the full potential as applied between the unipolar electrodes results in current flow across the electrodes.

It will be appreciated that the cell housing 12, the entry feed box 16 and cell head 17, and including all the walls 26 in the cell head 17 and walls in the inlet end of the passage 14 are formed of a non-conductive material, such as synthetic plastics material or the like.

The length of the non-conductive walls 26 and the wall inserts 30 at the inlet end of the cell are of a length which may be a function of the conductivity of the solution whereby current is caused to flow across the electrodes and not along the walls to the outer ends thereof. Thus, the path for a short circuit between electrodes at different electrical potential is extended by the length of the non-conductive walls, and the current path of least resistance becomes the current path through the solution contained between the surfaces of the electrodes.

It will be understood that solution may be caused to flow through the housing 12 by being pumped into the feed box 16 through the inlet 29. Other ports on the feed box may be used for mounting instruments or as drain points or the like.

What is claimed is:

1. An electrolysis cell comprising: a housing defining a passage for electrolyte to be subjected to electrolysis, the housing having an inlet end and an outlet end, a plurality of opposed guides extending longitudinally of the passage comprising a plurality of channels separated by spacers, a plurality of substantially parallel plate electrodes supported in spaced relation by the guides wherein longitudinal edges of the electrodes are engaged within the channels, the electrodes dividing the passage into a plurality of longitudinal electrolyte passageways, spaced wall means at both the inlet and outlet ends of the passage, the respective inlet and outlet wall means each corresponding in number to the number of electrodes, the wall means defining inlet passageways and outlet passageways communicating with the respective electrolyte passageways defined by the electrodes, the wall means confining electrolyte to the respective passageways.

2. An electrolysis cell according to claim 1 wherein the wall means extend substantially co-planar with the electrodes.

3. An electrolysis cell according to claim 2 wherein end surfaces of the wall means engage corresponding edges of the electrodes to form respective separate, individual passageways for the flow of electrolyte incorporating the series of inlet passageways, electrode passageways and outlet passageways.

4. An electrolysis cell according to claim 2 wherein the guides comprise a plurality of channels separated by spacers, and longitudinal edges of the electrodes are engaged within the channels.

5. An electrolysis cell according to claim 2 wherein the guides are formed integral with the walls of the housing.

6. An electrolysis cell according to claim 2 wherein the inlet end passageways extend in the longitudinal direction of the housing.

7. An electrolysis cell according to any claim 2 wherein the outlet end passageways extend at right angles to the longitudinal direction of the housing.

8. An electrolysis cell according to claim 2 wherein the outlet end is contained within a cell head mounted to a main housing.

9. An electrolysis cell according to claim 2 wherein the wall means in the outlet end are integral with the cell head which also incorporates the electrode guides along opposite side walls.

10. An electrolysis cell according to claim 2 wherein the inlet wall means are engaged with and form extensions of the electrodes at the inlet ends thereof.

11. An electrolysis cell according to claim 1 wherein end surfaces of the wall means engage corresponding edges of the electrodes to form respective separate, individual passageways for the flow of electrolyte incorporating the series of inlet passageways, electrode passageways and outlet passageways.

12. An electrolysis cell according to claim 1 wherein the guides are formed integral with the walls of the housing.

13. An electrolysis cell according to claim 1 wherein the inlet end passageways extend in the longitudinal direction of the housing.

14. An electrolysis cell according to claim 1 wherein the outlet end passageways extend at right angles to the longitudinal direction of the housing.

15. An electrolysis cell according to claim 14 wherein the end surfaces of the wall means in the outlet end engage side edges of the electrodes extending into the cell head.

16. An electrolysis cell according to claim 1 wherein the outlet end is contained within a cell head mounted to a main housing.

17. An electrolysis cell according to claim 1 wherein the wall means in the outlet end are integral with the cell head which also incorporates the electrode guides along opposite side walls.

18. An electrolysis cell according to claim 1 wherein the inlet wall means are engaged with and form extensions of the electrodes at the inlet ends thereof.

19. An electrolysis cell comprising: a housing defining a passage for electrolyte to be subjected to electrolysis, the housing having an inlet end and an outlet end, a plurality of opposed guides extending longitudinally of the passage which are formed integral with the walls of the housing, a plurality of substantially parallel plate electrodes supported in spaced relation by the guides, the electrodes dividing the passage into a plurality of longitudinal electrolyte passageways, spaced wall means at both the inlet and outlet ends of the passage, the respective inlet and outlet wall means each corresponding in number to the number of electrodes, the wall means defining inlet passageways and outlet passageways communicating with the respective electrolyte passageways defined by the electrodes, the wall means confining electrolyte to the respective passageways.

20. An electrolysis cell comprising a housing defining a passage for electrolyte to be subjected to electrolysis, the housing having an inlet end and an outlet end, a plurality of opposed guides extending longitudinally of the passage, a plurality of substantially parallel plate electrodes supported in spaced relation by the guides, the electrodes dividing the passage into a plurality of longitudinal electrolyte passageways, spaced wall means at both the inlet and outlet ends of the passage, the respective inlet and outlet wall means each corresponding in number to the number of electrodes, the wall means defining inlet passageways and outlet passageways communicating with the respective electrolyte passageways defined by the electrodes, the wall means confining electrolyte to the respective passageways and wherein the outlet end passageways extend at right angles to the longitudinal direction of the housing.

21. An electrolysis cell comprising a housing defining a passage for electrolyte to be subjected to electrolysis, the housing having an inlet end and an outlet end, a plurality of opposed guides extending longitudinally of the passage, a plurality of substantially parallel plate electrodes supported in spaced relation by the guides, the electrodes dividing the passage into a plurality of longitudinal electrolyte passageways, spaced wall means at both the inlet and outlet ends of the passage, the respective inlet and outlet wall means each corresponding in number to the number of electrodes, the wall means defining inlet passageways and outlet passageways communicating with the respective electrolyte passageways defined by the electrodes, the wall means confining electrolyte to the respective passageways, wherein the outlet end is contained within a cell head mounted to the housing.

22. An electrolysis cell according to claim 21 wherein the wall means in the outlet end are integral with the cell head which also incorporates the electrode guides along opposite side walls.

23. An electrolysis cell according to claim 21 wherein the end surfaces of the wall means in the outlet end engage side edges of the electrodes extending into the cell head.

24. An electrolysis cell comprising: a housing defining a passage for electrolyte to be subjected to electrolysis, the housing having an inlet end and an outlet end, a plurality of opposed guides extending longitudinally of the passage, a plurality of substantially parallel plate electrodes supported in spaced relation by the guides, the electrodes dividing the passage into a plurality of longitudinal electrolyte passageways, spaced wall means at both the inlet and outlet ends of the passage, the respective inlet and outlet wall means each corresponding in number to the number of electrodes, the wall means defining inlet passageways and outlet passageways communicating with the respective electrolyte passageways defined by the electrodes, the wall means confining electrolyte to the respective passageways wherein the inlet wall means are engaged with and form extensions of the electrodes at the inlet ends thereof.

25. An electrolysis cell comprising: a housing defining a passage for electrolyte to be subjected to electrolysis, the housing having an inlet end and an outlet end, a plurality of opposed guides extending longitudinally of the passage comprising a plurality of channels separated by spacers, a plurality of substantially parallel plate electrodes supported in spaced relation by the guides, wherein longitudinal edges of the electrodes are engaged with the channels, the electrodes dividing the passage into a plurality of longitudinal electrolyte passageways.

26. An electrolysis cell comprising: a housing defining a passage for electrolyte to be subjected to electrolysis, the housing having an inlet end and an outlet end, a plurality of opposed guides extending longitudinally of the passage, a plurality of substantially parallel plate electrodes supported in spaced relation by the guides, the electrodes dividing the passage into a plurality of longitudinal electrolyte passageways, wherein at the outlet end the electrolyte passageways extend at right angles to the longitudinal direction of the housing.

27. An electrolysis cell comprising: a housing defining a passage for electrolyte to be subjected to electrolysis, the housing having an inlet end and an outlet end, a plurality of opposed guides extending longitudinally of the passage, a plurality of substantially parallel plate electrodes supported in spaced relation by the guides, the electrodes dividing the passage into a plurality of longitudinal electrolyte passageways, wherein the guides are formed integral with adjacent walls of the housing.

* * * * *